(12) United States Patent
Cohen et al.

(10) Patent No.: US 12,300,944 B2
(45) Date of Patent: May 13, 2025

(54) PROTECTION CIRCUITS FOR UNTETHERED CABLES

(71) Applicant: Apple Inc., Cupertino, CA (US)

(72) Inventors: Denver E. Cohen, Cresskill, NJ (US); Breton M. Saunders, Los Gatos, CA (US); Srivatsav Venkatesan, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 902 days.

(21) Appl. No.: 17/484,765

(22) Filed: Sep. 24, 2021

(65) Prior Publication Data
US 2023/0101225 A1    Mar. 30, 2023

(51) Int. Cl.
| | |
|---|---|
| *H02H 7/22* | (2006.01) |
| *H01R 12/70* | (2011.01) |
| *H01R 13/6581* | (2011.01) |
| *H01R 13/66* | (2006.01) |
| *H02H 7/26* | (2006.01) |
| *G06F 1/00* | (2006.01) |
| *H01R 31/06* | (2006.01) |
| *H02H 9/00* | (2006.01) |

(52) U.S. Cl.
CPC ..... *H01R 13/6666* (2013.01); *H01R 12/7088* (2013.01); *H01R 13/6581* (2013.01); *H01R 13/6691* (2013.01); *H02H 7/268* (2013.01); *G06F 1/00* (2013.01); *H01R 13/66* (2013.01); *H01R 13/6675* (2013.01); *H01R 13/6683* (2013.01); *H01R 31/065* (2013.01); *H02H 9/00* (2013.01)

(58) Field of Classification Search
CPC ... H02H 7/228; H01R 13/6666; H01R 31/065
See application file for complete search history.

(56) References Cited

U.S. PATENT DOCUMENTS

| | | | |
|---|---|---|---|
| 11,545,823 B2* | 1/2023 | Costa | H02H 3/22 |
| 2011/0104940 A1* | 5/2011 | Rabu | H01R 31/065 |
| | | | 439/502 |
| 2016/0056588 A1* | 2/2016 | Motoichi | H01R 13/7137 |
| | | | 439/620.22 |
| 2017/0108910 A1 | 4/2017 | Goh et al. | |

FOREIGN PATENT DOCUMENTS

| | | |
|---|---|---|
| KR | 20140118700 A | 10/2014 |
| KR | 20180012329 A | 2/2018 |

* cited by examiner

*Primary Examiner* — Adolf D Berhane
*Assistant Examiner* — Afework S Demisse
(74) *Attorney, Agent, or Firm* — Kilpatrick Townsend & Stockton LLP

(57) ABSTRACT

Circuits, methods, and apparatus that can provide an untethered cable that can safely provide power using a variety of power adapters, can protect users from voltages at exposed contacts of a connector insert, and can disconnect from a power adapter when damage to the cable is detected.

20 Claims, 8 Drawing Sheets

PROTECTION CIRCUITS FOR UNTETHERED CABLES

BACKGROUND

The number of types of electronic devices that are commercially available has increased tremendously the past few years and the rate of introduction of new devices shows no signs of abating. Devices such as tablets, laptops, netbooks, desktops, all-in-one computers, cell phones, storage devices, portable media players, navigation systems, monitors, and others, have become ubiquitous.

Power and data can be provided from one of these devices to another over cables that can include one or more wires, fiber optic cables, or other conductor. Connector inserts can be located at each end of these cables and can be inserted into connector receptacles in the communicating or power transferring devices in order to provide pathways for data and power between them. Cables having connector inserts on each end can be referred to as untethered cables, as compared to a tethered cable that has at least one end terminating inside of an electronic component.

An untethered cable can be used to convey power from a power adapter to an electronic device, such as a portable computing device. A cable having an industry standard connector for receiving power might need to be able to operate with a large variety of power adapters. It can therefore be desirable that an untethered cable be able to safely convey power from a variety of power adapters.

When a first connector insert at first end of an untethered cable is plugged into a power adapter, power supply voltages can be exposed at contacts of a second connector insert at a second end of the cable. It can therefore be desirable to include measures to prevent injury as a result of an inadvertent touching of the power supply contact. Also, a cable can become damaged during use. It can therefore be desirable to disconnect power from the power adapter when damage to the cable occurs.

Thus, what is needed are circuits, methods, and apparatus that can provide untethered cables that can safely provide power using a variety of power adapters, can protect users from voltages at exposed contacts of a connector insert, and can disconnect from a power adapter when damage to the cable occurs.

SUMMARY

Accordingly, embodiments of the present invention can provide circuits, methods, and apparatus that can provide untethered cables that can safely provide power using a variety of power adapters, can protect users from voltages at exposed contacts of a connector insert, and can disconnect from a power adapter when damage to the cable occurs.

These and other embodiments of the present invention can provide protection circuitry that can safely provide power when used with a variety of power adapters. The protection circuitry can be in a cable that provides power from a power adapter connected to a first connector insert of the cable to an electronic device connected to a second connector insert of the cable. The employed power adapter can be of varying quality. According, instead of allowing a power adapter to control when power is provided to the electronic device, the protection circuitry can act as an intermediary to ensure that power is limited or not provided to the second connector insert until (and then only so long as) safety criteria are met. These safety criteria can include ensuring that a valid and compatible electronic device is attached at the second connector insert, that there is not detected damage to the cable, that the temperature of the second connector insert or other cable portions are within an acceptable range, that excess current is not being drawn from the second connector insert, that input voltages received from the power adapter are in an acceptable range, that moisture is not detected at the second connector insert, that the cable is authenticated by the electronic device, as well as other safety criteria.

These and other embodiments of the present invention can provide protection circuity that can protect users from voltages at exposed contacts of a connector insert. To do this, the power that can be drawn at a power contact of the connector insert can be limited until the protection circuitry determines that a valid electronic device is connected to the connector insert. For example, the power supply can be current limited using a resistance. This limitation can protect users from being exposed to voltages that can provide large currents. The presence of a valid electronic device at the connector insert can be determined using a handshaking arrangement where a power-delivery controller in the protection circuitry in the cable can send a signal to a valid electronic device and the electronic device can return an acknowledgment. Once the acknowledgment is received, the current limitation can be removed and higher power can be negotiated between the electronic device and the power adapter. The acknowledgement can be such that inadvertent contact with a user is unlikely to be mistaken for an acknowledgement. For example, the signal sent by the protection circuit can be data and the acknowledgement can be a cyclical redundancy check of that data. This signal can be sent and acknowledgements can be received on a continuous basis such that when the electronic device is disconnected, power can be removed from exposed contacts of the connector insert.

These and other embodiments of the present invention can provide protection circuity that can detect damage to a cable and turn off power in the cable in response. A first end of the cable having a first connector insert housing a power-limiting controller can be connected to a power adapter. A second end of the cable having a second connector insert housing a power-delivery controller can be connected to an electronic device. In response to successful handshaking between the power-delivery controller and the electronic device, the power-delivery controller in the second connector insert can send a periodic signal to the power-limiting controller in the first connector insert. In the event damage to the cable occurs stopping handshaking between the power-delivery controller and the electronic device, the power-delivery controller can stop the periodic signal and the power-limiting controller can turn off power in the cable in response. In the event damage to the cable occurs disconnecting the periodic signal, the power-limiting controller can turn off power in the cable in response. In the event damage to the cable occurs causing the power-limiting controller to provide excess current, the power-limiting controller can turn off power in the cable in response. In the event damage to the cable occurs causing excess temperature in the second connector insert, the power-delivery controller can stop the periodic signal and the power-limiting controller can turn off power in the cable in response.

These and other embodiments of the present invention can provide additional safeguards and protections as well. For example, embodiments of the present invention can include protection circuits that can reduce or limit corrosion. Instead of maintaining an impedance at a voltage on a connection detection contact in the second connector insert, the power-delivery controller can pulse the impedance. The impedance can be active and connected for a duration that is sufficiently long to detect an electronic device connected to the second connector insert. The impedance can be disconnected from the connection detection contact afterwards. In the event that moisture is present at the second connector insert contacts, this pulsing can reduce the average electric field and can help to reduce corrosion.

These and other embodiments of the present invention can provide additional corrosion mitigation by determining whether a rise time of a voltage on the connection detection contact meets a specification during a pulse. If it does not, moisture might be present and power is not provided to a power contact of the second connector insert. By not providing power when moisture is possibly present, corrosion can be reduced at the power contact. When moisture is possibly detected, the power-delivery controller can back off a first duration before applying another pulsed impedance. This duration can be increased after moisture is possibly detected a number of times.

These and other embodiments of the present invention can provide authentication for the cable. This can allow the electronic device to protect itself from damage caused by possibly dangerous cables. During charging, an electronic device connected at the second connector insert of a cable can request a certificate serial number from an authentication circuit in the cable, for example in the second connector insert. The authentication circuit can provide the serial number, which can be verified by the electronic device. If the serial number is valid, the electronic device can request a certificate from the authentication circuit in the cable. If the certificate is valid, the electronic device can provide challenge data to the authentication circuit, which can provide a response that includes the challenge data encrypted by the authentication circuit using a private key. The electronic device can decrypt the response using a public key, and then compare the result to the original challenge data. In the event of a match, charging through the cable can continue. In the event of a mismatch, charging can be terminated.

Embodiments of the present invention can provide protection circuits that can be used with cables connecting various types of devices, such as portable computing devices, tablet computers, desktop computers, laptops, all-in-one computers, wearable computing devices, cell phones, smart phones, media phones, storage devices, portable media players, navigation systems, monitors, power supplies, power adapters, remote control devices, chargers, and other devices. These cables can provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, MagSafe®, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

Various embodiments of the present invention can incorporate one or more of these and the other features described herein. A better understanding of the nature and advantages of the present invention can be gained by reference to the following detailed description and the accompanying drawings.

DESCRIPTION OF EXEMPLARY EMBODIMENTS

Figure 1:
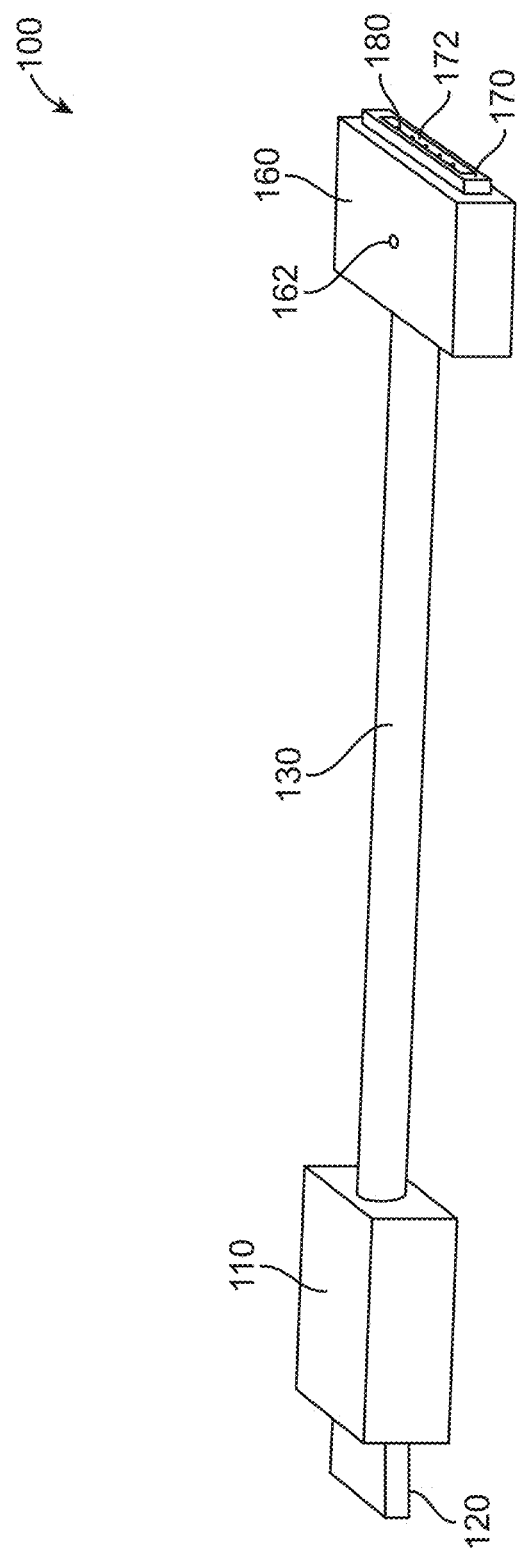
FIG. 1 illustrates an untethered cable according to an embodiment of the present invention.

FIG. 1 illustrates an untethered cable according to an embodiment of the present invention. This figure, as with the other included figures, is shown for illustrative purposes and does not limit either the possible embodiments of the present invention or the claims.

Cable 100 can include first connector insert 110 and second connector insert 160. First connector insert 110 can include shield 120 around a number of contacts (not shown.) Shield 120 can be inserted into a connector receptacle of a power adapter 310 (shown in FIG. 3) or other electronic device capable of supplying power (referred to as power adapter 310 for simplicity.) Second connector insert 160 can include opening 162 for one or more light emitting diode status indicators. Second connector insert 160 can further include attraction plate 170 having recess 172 for a number of contacts 180. Attraction plate 170 can be inserted into a recess of a connector receptacle of electronic device 360 (shown in FIG. 3.) Electronic device 360 can be a portable computing device, tablet computer, desktop computer, laptop, all-in-one computer, wearable computing device, smart phone, storage device, portable media player, navigation system, monitor, power supply, remote control device, or other electronic device. Contacts in first connector insert 110 can be electrically connected to contacts in second connector insert 160 via one or more conduits in cable portion 130. Contacts in first connector insert 110 and second connector insert 160 and one or more conduits in cable portion 130 can be connected to circuits in either or both first connector insert 110 and second connector insert 160, such as the protection circuit of FIG. 2.

In this example, first connector insert 110 can be a universal serial bus (USB) Type-C connector insert. In these and other embodiments of the present invention, first connector insert 110 can be compatible with another standard or proprietary connector. Second connector insert 160 can be a magnetic connector. For example, second connector insert 160 can be a connector that is the same or similar to a MagSafe® connector developed by Apple Inc. of Cupertino Calif. In these and other embodiments of the present invention, second connector insert 160 can be compatible with another standard or proprietary connector.

One or more contacts 180 of second connector insert 160 can be positioned in recess 172 of attraction plate 170 in such a way that they might be touched by a user. As such, it can be desirable to prevent voltages from appearing on contacts 180 when first connector insert 110 is plugged into a connector receptacle of power adapter 310. Accordingly, embodiments of the present invention can provide protection circuits that can help to prevent potentially dangerous voltages from appearing on contacts 180 when contacts 180 can be touched by a user.

Further, if damage were to occur to a portion of cable 100, potentially dangerous voltages could be exposed such that contact with a user might be possible. Accordingly, these protection circuits can also turn off power in the cable when damage is detected. An example is shown in the following figure.

Figure 2:
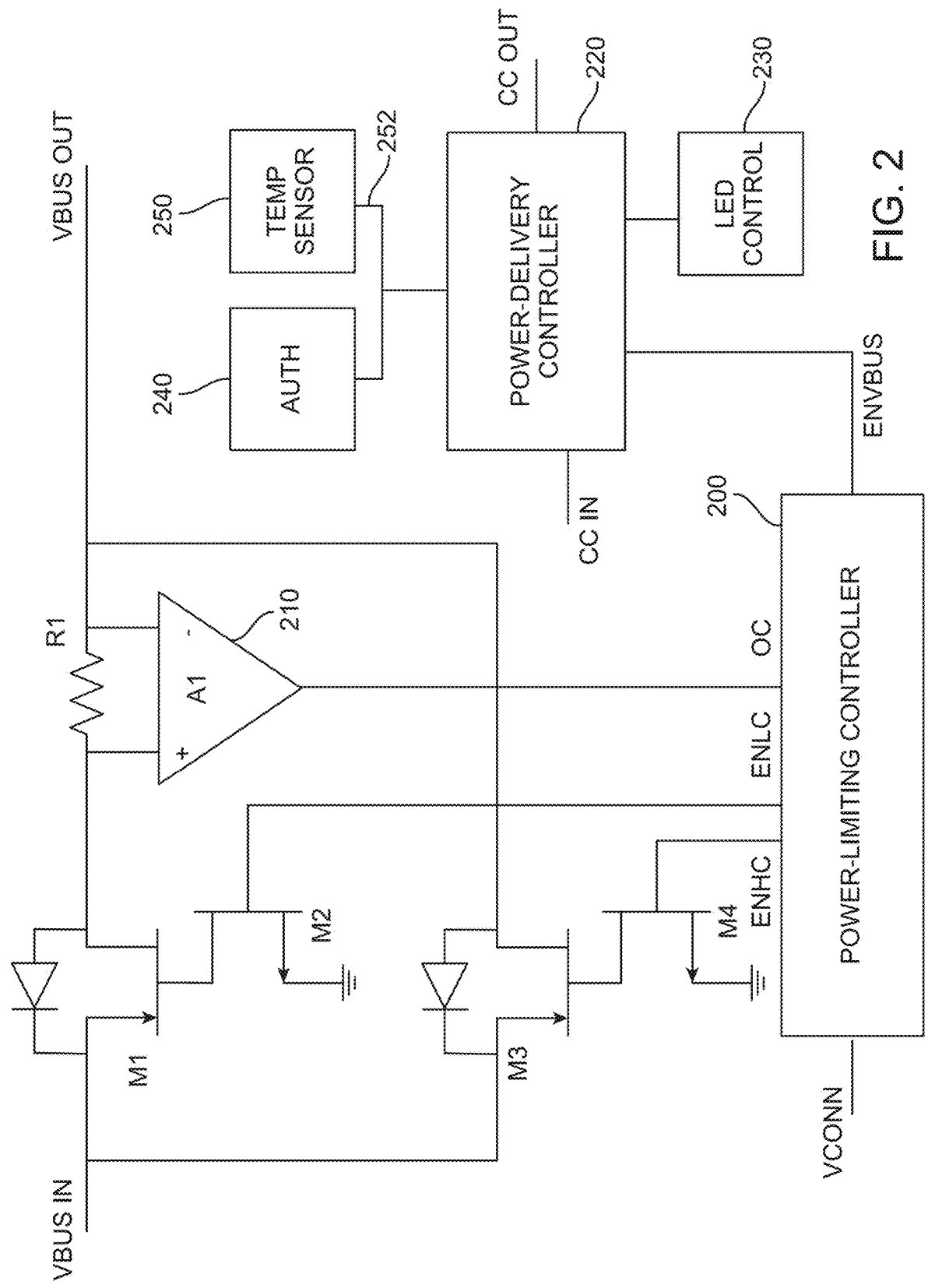
FIG. 2 is a block diagram of a protection circuit according to an embodiment of the present invention.

FIG. 2 is a block diagram of a protection circuit according to an embodiment of the present invention. When first connector insert 110 (shown in FIG. 1) is inserted into power adapter 310 (shown in FIG. 3), power adapter 310 can provide a pull-up impedance that can be received on a connection detection contact of first connector insert 110, such as a CC contact, which can be connected to the CC IN terminal of power-delivery controller 220. Power-delivery controller 220 can provide a pulldown impedance at CC IN, from which power adapter 310 can determine that a connection to a power-sink device has been made. In response, a VBUS power supply can be received from power adapter 310 on one or more VBUS contacts of first connector insert 110. These VBUS contacts can be coupled to VBUS IN. The voltage on VBUS IN can be used to generate a power supply for power-delivery controller 220. This in turn can cause power-delivery controller 220 to provide a pull-up impedance at terminal CC OUT. If power-delivery controller 220 detects a pulldown impedance having a resistance in a specified range, power-delivery controller 220 can determine that a valid electronic device might be present.

The CC IN terminal can be a first input/output terminal, while the CC OUT terminal can be a second input/output terminal. This way, instead of simply passing a CC signal from power adapter 310 to electronic device 360 and giving control of the delivery of power to a possibly suspect power adapter 310, power-delivery controller 220 can withhold power until safety criteria are met. Power can then be delivered only so long as these safety criteria are met. These safety criteria can include ensuring that a valid and compatible electronic device 360 is attached at second connector insert 160 (shown in FIG. 1), that there is not detected damage to cable 100, that the temperature of second connector insert 160 or other cable portions are within an acceptable range, that excess current is not being drawn from second connector insert 160, that input voltages received from power adapter 310 are in an acceptable range, that moisture is not detected at second connector insert 160, that cable 100 is authenticated by electronic device 360, as well as other safety criteria.

Unfortunately, contact with the user can be mistaken for a pulldown impedance having a resistance in the specified range. Accordingly, further steps can be taken by this protection circuit before potentially dangerous voltages are provided to second connector insert 160.

Once power-delivery controller 220 determines that a valid electronic device 360 might be connected to second connector insert 160, power-delivery controller 220 can instruct power-limiting controller 200 to provide a current-limited voltage. For example, power-delivery controller 220 can instruct power-limiting controller 200 to drive line ENLC high, thereby turning on transistor M2 and transistor M1. This can connect the voltage on VBUS IN to VBUS OUT through resistor R1. VBUS OUT can be connected to one or more power contacts of second connector insert 160. Resistor R1 can provide a current limit, thereby limiting the power that can be delivered in the event of the user contact.

Figure 5:
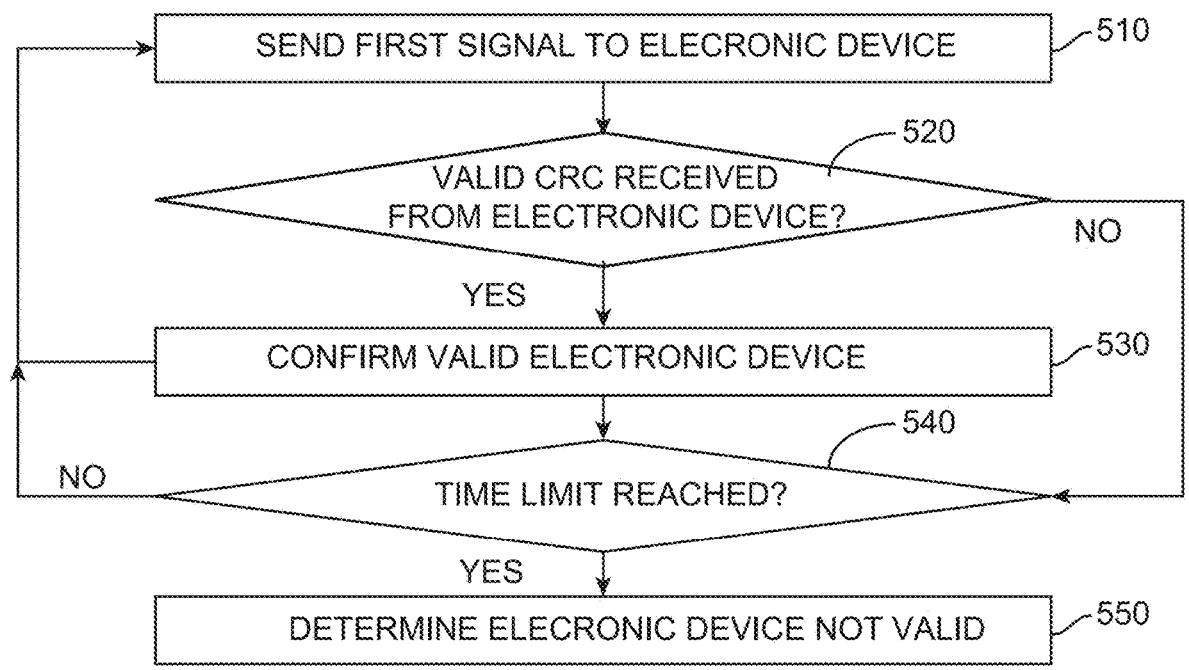
FIG. 5 illustrates a handshaking routine that can be employed between a power-delivery controller and an electronic device according to an embodiment of the present invention.

After power-delivery controller 220 determines that a valid electronic device 360 might be connected to second connector insert 160, power-delivery controller 220 can take further steps to ensure that a valid electronic device 360 is actually connected to second connector insert 160. These further steps can help to avoid dangerous voltages from being applied to contacts 180 of second connector insert 160 when a user might contact them. For example, power-delivery controller 220 can send a first signal over CC OUT to electronic device 360. In response, electronic device 360 can return an acknowledgment to the power-delivery controller 220 using the same path. The completion of this handshaking routine is unlikely to be mimicked by inadvertent contact with a user. Accordingly, when this handshaking routine is completed, power-delivery controller 220 can determine that a valid electronic device 360 is connected at second connector insert 160. In response, power-delivery controller 220 can instruct power-limiting controller 200 to provide the voltage on VBUS IN directly to the electronic device, without the current limitation provided by resistor R1. That is, power-delivery controller 220 can instruct power-limiting controller 200 to drive ENHC high, thereby turning on transistor M4, which in turn can turn on transistor M3. Transistor M3 can connect VBUS IN directly to VBUS OUT, bypassing R1. In this way, power provided by power adapter 310 to one or more VBUS contacts of first connector insert 110 can be provided on the VBUS OUT line to one or more VBUS contacts of second connector insert 160, where it can be provided to electronic device 360. When this handshaking routine is not completed within a specific duration, power-delivery controller 220 can instruct power-limiting controller 200 to turn off all power to VBUS OUT and to electronic device 360. An example of this handshaking is shown in FIG. 5.

Figure 6:
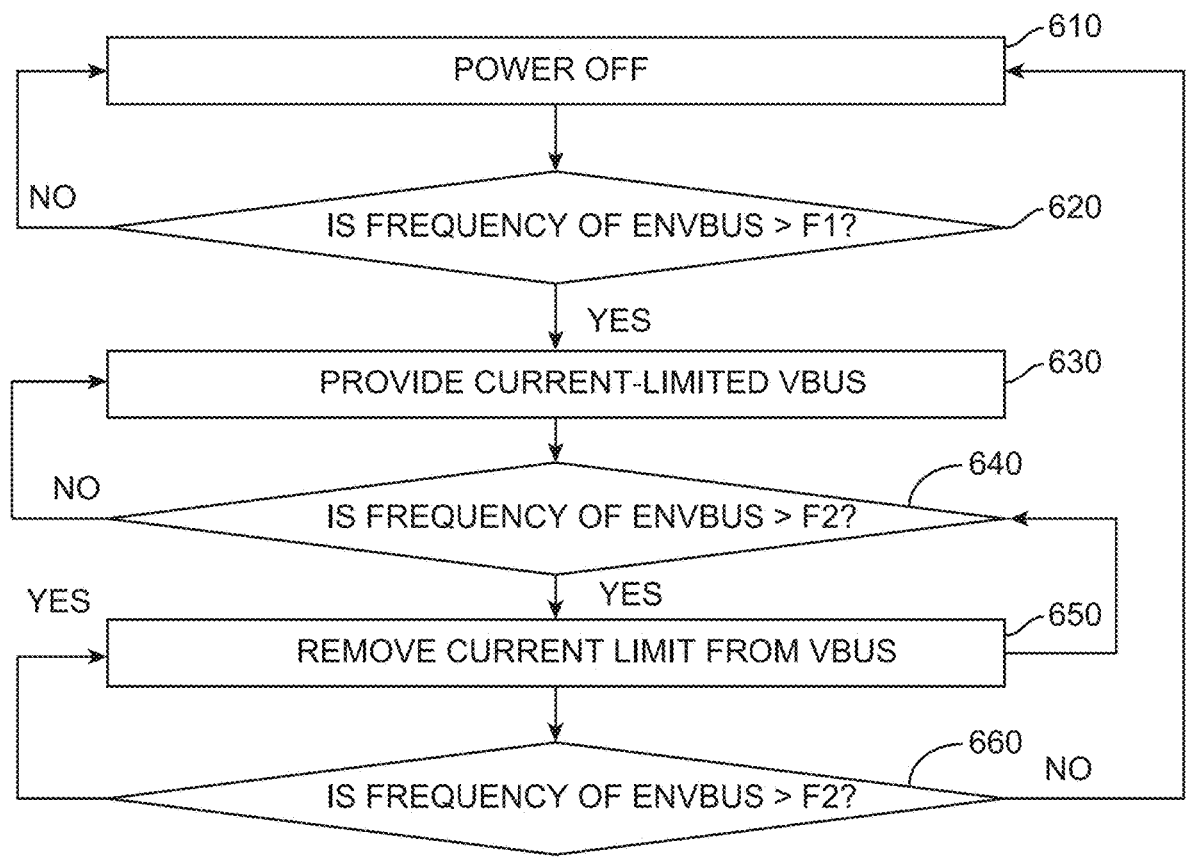
FIG. 6 is a block diagram illustrating the operation of a power-limiting controller according to an embodiment of the present invention.
Figure 7:
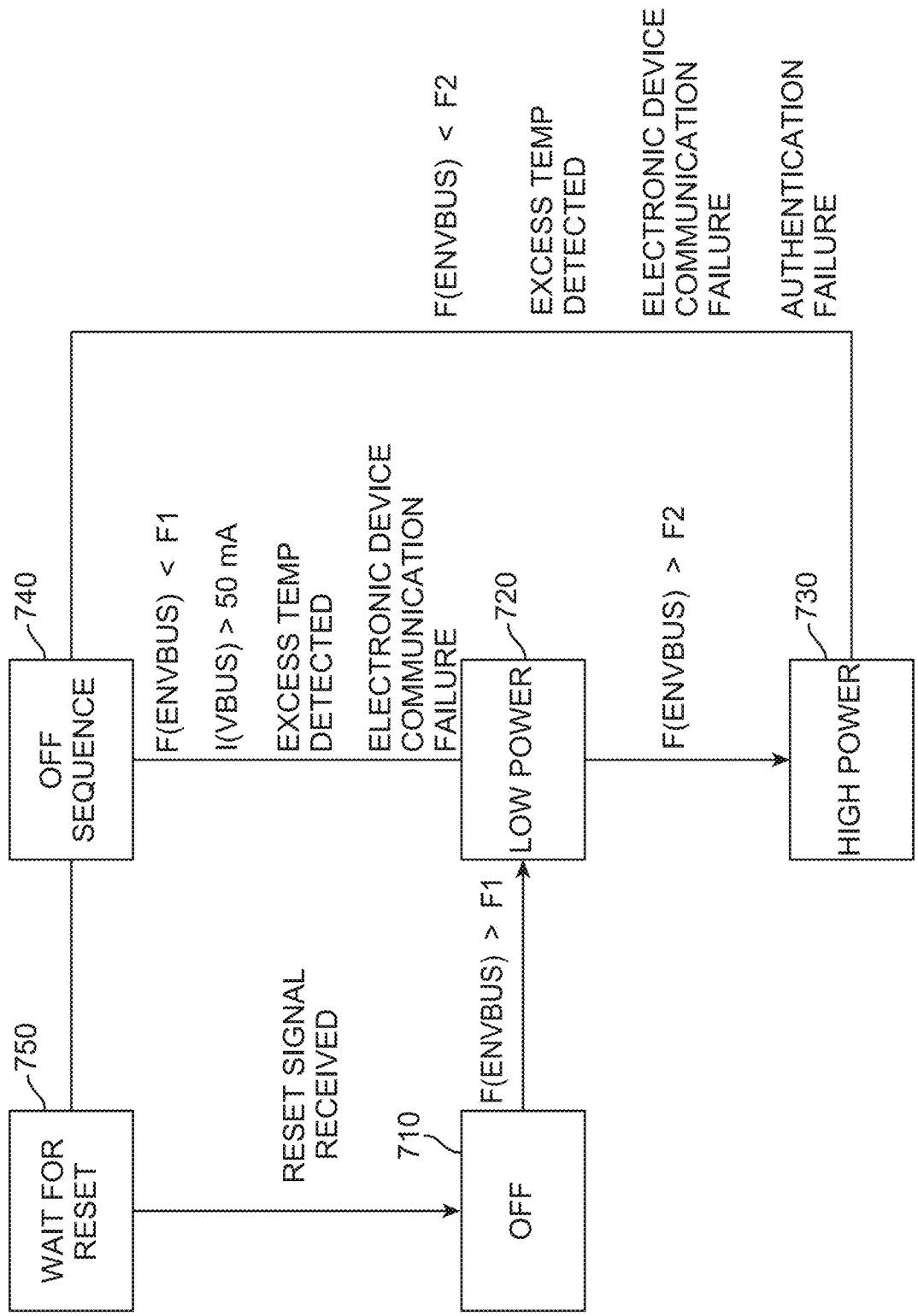
FIG. 7 is a state diagram illustrating the operation a power-limiting controller according to an embodiment of the present invention.

Accordingly, power-delivery controller 220 can instruct power-limiting controller 200 to either not deliver power, to deliver limited power (that is, power current limited by R1), or to deliver power (that is, power not limited by R1) on VBUS OUT. In one example, power-delivery controller 220 can provide an oscillating or periodic signal on ENVBUS to power-limiting controller 200 when either limited power or power can be delivered. In the absence of this oscillating or periodic signal, power-limiting controller 200 can turn off all power to VBUS OUT. Power-delivery controller 220 can vary the frequency of the oscillating or periodic signal on ENVBUS to instruct power-limiting controller 200 to either deliver limited power or power. An example of this is shown in FIG. 6 and FIG. 7.

These and other embodiments of the present invention can provide further protection features. For example, when power-limiting controller 200 provides current-limited power at VBUS OUT, resistor R1 can act to limit the current that can be provided at VBUS OUT and therefore the VBUS contact of the second connector insert 160. Amplifier A1 210 can have inputs coupled across resistor R1. When sufficient current is drawn at VBUS OUT, amplifier A1 210 can send a signal on line OC to power-limiting controller 200. This can inform power-limiting controller 200 that excess current is being drawn from VBUS, and power-limiting controller 200 can turn off the limited power by turning of transistor M1. This can further help to protect a user touching the VBUS contact of second connector insert 160.

This protection circuit can further include a temperature sensor 250. Temperature sensor 250 can sense a temperature of contacts 180 or other portions of second connector insert 160 or cable 100. This can help to prevent damage to cable 100 and electronic device 360.

These and other embodiments of the present invention can provide protection circuits that can reduce or limit corrosion. Instead of maintaining a pull-up impedance at a voltage on a CC OUT, and therefore the CC contact of second connector insert 160, the power-delivery controller can pulse the pull-up impedance. The pull-up impedance can be active and connected for a duration that is sufficiently long to detect electronic device 360 connected to second connector insert 160. The impedance can be disconnected from CC OUT afterwards. In the event that moisture is present at the second connector insert CC contact, this pulsing can reduce the average electric field and can help to reduce corrosion.

These and other embodiments of the present invention can provide additional corrosion mitigation by determining whether a rise time of a voltage on the CC OUT terminal meets a specification during a pulse. If it does not, moisture might be present and power is not provided to the one or more VBUS power supply contacts of second connector insert 160. By not providing power when moisture is possibly present, corrosion can be reduced at the VBUS contact. When moisture is possibly detected, power-delivery controller 220 can back off a first duration before applying another pulsed impedance. This duration can be increased after moisture is possibly detected a number of times.

This protection circuit can further include authentication circuit 240. Authentication circuit 240 can help to protect electronic device 360 from damage that might be caused by a defective cable 100. During charging, electronic device 360 connected at second connector insert 160 of cable 100 can request a certificate serial number from authentication circuit 240 in cable 100, for example in second connector insert 160. Authentication circuit 240 can provide the serial number, which can be verified by electronic device 360. If the serial number is valid, electronic device 360 can request a certificate from authentication circuit 240 in cable 100. If the certificate is valid, electronic device 360 can provide challenge data to authentication circuit 240, which can provide a response that includes the challenge data encrypted by authentication circuit 240 using a private key. Electronic device 360 can decrypt the response using a public key, and then compare the result to the original challenge data. In the event of a match, charging through cable 100 can continue. In the event of a mismatch, charging can be terminated.

Authentication circuit 240 and temperature sensor 250 can communicate with power-delivery controller 220 over an Inter-Integrated Circuit (I2C) bus 252 or other communication path.

LED control 230 can be used by power-delivery controller 220 to provide informative illuminations at opening 162 of second connector insert 160. For example, various colors can indicate different charging states of electronic device 360. A light provided by a green LED can indicate that a battery (not shown) in electronic device 360 is fully charged. A light provided by an amber LED can indicate the charging is occurring and that the battery in electronic device 360 is not yet fully charged.

These and other embodiments of the present invention can protect users from exposure to possibly dangerous voltages at contacts 180 of second connector insert 160. Until a valid electronic device is detected using a handshaking routine, the power-limiting controller 200 can provide a current-limited power supply at the second connector insert 160, thereby protecting users. The handshaking routine between power-delivery controller 220 and electronic device 360 can cease when electronic device 360 is disconnected from second connector insert 160. This can stop the ENVBUS signal from being periodic and leaving it in either a high or low state. This can instruct power-limiting controller 200 to stop providing power to the VBUS contacts of second connector insert 160, thereby protecting users.

These and other embodiments of the present invention can provide protection circuity that can detect damage to cable 100 and turn off power in cable 100 in response. A first end of cable 100 having first connector insert 110 housing power-limiting controller 200 can be connected to power adapter 310. A second end of cable 100 having second connector insert 160 housing power-delivery controller 220 can be connected to electronic device 360. In response to successful handshaking between power-delivery controller 220 and electronic device 360, power-delivery controller 220 in second connector insert 160 can send a periodic signal, ENVBUS, to power-limiting controller 200 in first connector insert 110. In the event damage to cable 100 occurs stopping handshaking between power-delivery controller 220 and electronic device 360, power-delivery controller 220 can stop the periodic signal ENVBUS and power-limiting controller 200 can turn off power in cable 100 in response. In the event damage to cable 100 occurs disconnecting the periodic signal ENVBUS, power-limiting controller 200 can turn off power in cable 100 in response. In the event damage to cable 100 occurs causing power-limiting controller 200 to provide excess current, power-limiting controller 200 can turn off power in cable 100 in response. In the event damage to cable 100 occurs causing excess temperature in second connector insert 160, power-delivery controller 220 can stop the periodic signal ENVBUS and power-limiting controller 200 can turn off power in cable 100 in response.

Power can be selectively turned off to various portions of this protection circuit to save power in some circumstances. For example, there can be two, three, or more than three power levels at which this protection circuit can operate. There can be an active-power level for when power-limiting controller 200 provides power to electronic device 360. There can be a deep-sleep power level where the clocks and power provided to power-limiting controller 200 and power-delivery controller 220 are largely shut off, and only enough circuitry to respond to a time out signal or interrupt signal is active. The deep-sleep power level can be the primary power level when no electronic device 360 is connected to second connector insert 160. In response to a time out signal or an interrupt signal, the protection circuit can leave the deep-sleep power level and enter an intermediate-power level. The intermediate-power level can be a power level between the active-power level and the deep-sleep power level. A time out signal can be received when it is time for power-delivery controller 220 to provide a pull-up impedance at CC OUT to determine whether electronic device 360 has been connected to second connector insert 160. In the intermediate-power level, the protection circuit can be powered enough to perform some tasks, such as providing the pull-up impedance at CC OUT. The deep-sleep power level can be particularly useful in reducing power provided by power adapter 310. Power adapter 310 can be inefficient in providing small amounts of power, but since the protection circuit draws only minimal power in the deep-sleep power level, this inefficiency might not result in large power losses.

The protection circuit of FIG. 2 can be implemented in various ways. For example, power-limiting controller 200 can be implemented as an integrated circuit. Transistor M1, M2, M3, and M4 can be implemented as separate components. For example, it can be useful to implement transistor M3 as a separate component since M3 can often dissipate a high amount of power. One or more of these transistors can alternatively be implemented on an integrated circuit with power-limiting controller 200. This is particularly true of transistor M2 and transistor M4, as their power dissipation and drive requirements are moderate. Similarly, amplifier A1 210 and resistor R1 can be implemented as separate components, amplifier A1 210 and resistor R1 can be implemented as a single integrated circuit, or amplifier A1 210 and resistor R1 can be implemented on a single integrated circuit with power-limiting controller 200. In these and other embodiments of the present invention, power-limiting controller 200, transistor M1, transistor M2, transistor M3, transistor M4, amplifier A1 210, and resistor R1, can be implemented in a single integrated circuit in first connector insert 110.

Other circuits and circuit topologies can be used to implement the various functions performed and provided by the circuitry of FIG. 2. For example, either or both transistor M1 and transistor M2, while shown as being complementary metal-oxide-semiconductor (CMOS) transistors, can instead be implemented as bipolar-junction transistors (BJTs), insulated-gate bipolar transistors (IGBTs), or other type of transistors. Either or both transistor M1 and transistor M2, while shown as P-MOS or p-channel transistors, can be implemented as N-MOS or n-channel transistors.

Power-delivery controller 220 can be implemented as an integrated circuit. Authentication circuit 240, temperature sensor 250, and LED control 230 can be implemented as separate integrated circuits, one or more of these can be combined as a single integrated circuit that can include power-delivery controller 220. For example, power-delivery controller 220, authentication circuit 240, temperature sensor 250, and LED control 230 can be combined as a single integrated circuit in second connector insert 160.

Circuits shown as being included in either power-limiting controller 200 or power-delivery controller 220 can be implemented as separate circuits. For example, an over-voltage protection circuit (not shown) that can protect CC OUT from excessive voltage can be included (as shown here) as part of power-delivery controller 220, or it can be a separate circuit between power-delivery controller 220 and a CC OUT contact in second connector insert 160.

Figure 3:
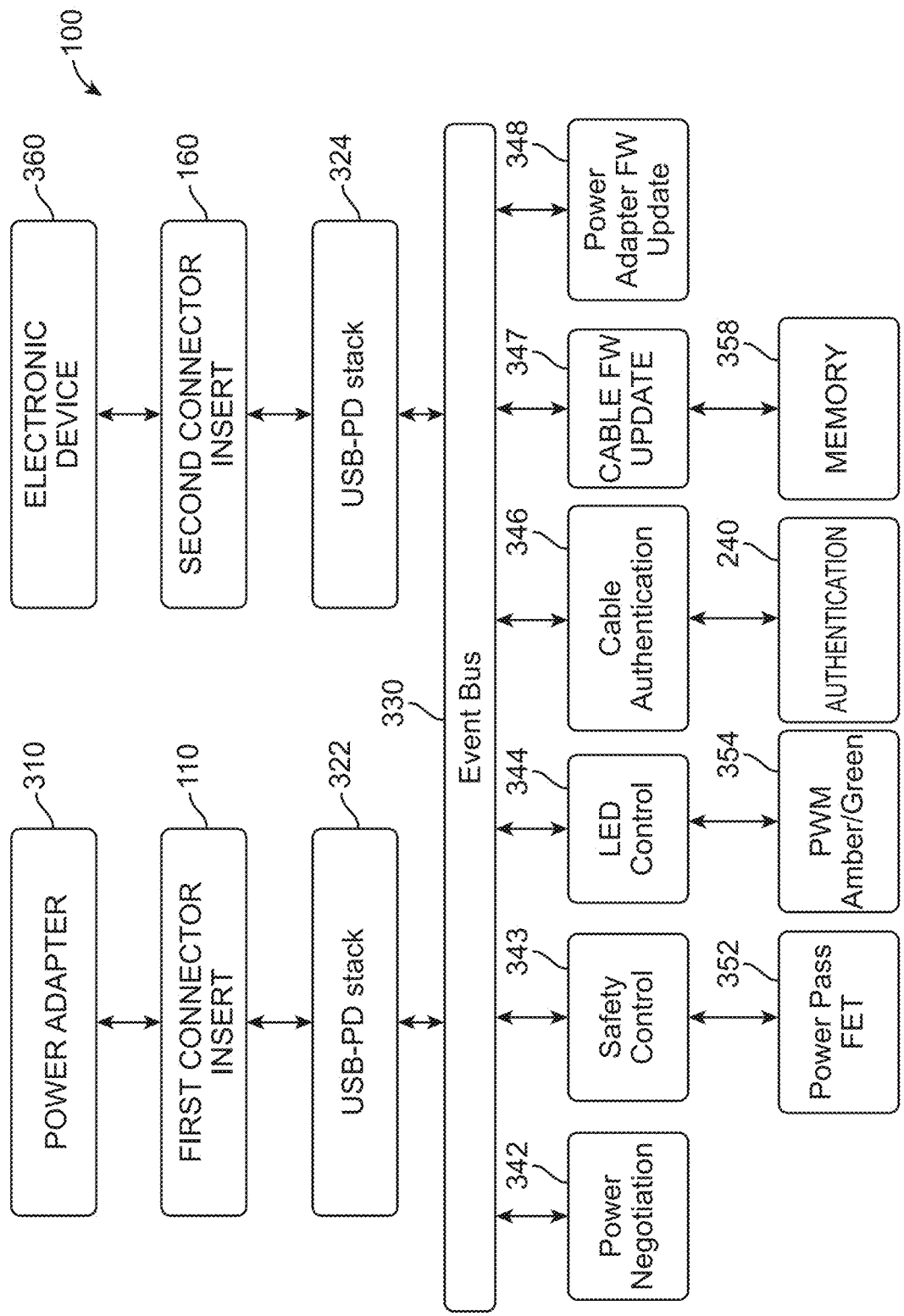
FIG. 3 illustrates an operational block diagram of an electronic system according to an embodiment of the present invention.

FIG. 3 illustrates an operational block diagram of a system according to an embodiment of the present invention. Power adapter 310 can provide power through cable 100 to electronic device 360. Power adapter 310 can connect to first connector insert 110, while electronic device 360 can connect to second connector insert 160 of cable 100. Commands sent and received using first connector insert 110 can be handled by USB-PD (power delivery) stack 322. Commands sent and received using second connector insert 160 can be handled by USB-PD stack 324. Routing between the stacks and firmware modules can be handled by event bus 330. The firmware modules can include power negotiation firmware module 342. Power negotiation firmware module 342 can handle negotiations for higher voltage levels power supplies to be provided to electronic device 360 by power adapter 310 after the presence of a valid electronic device 360 has been determined. Safety control firmware module 343 can turn off or limit power to be bus contact of the second connector insert. The hardware used for this can be power FETs 352, which can be implemented as transistors M1 and M3 in FIG. 2. An LED control firmware module 344 can be used to control LED control 230 in FIG. 2, which can control LEDs 354. Cable authentication firmware module 346 can be executed using authentication circuit 240. Cable firmware updates 347 can be stored in memory 358. Power adapter firmware updates 348 can be passed from electronic device 360 to power adapter 310 via cable 100.

The protection circuit of FIG. 2 can include power-delivery controller 220 and power-limiting controller 200. Power-delivery controller 220 can be housed in second connector insert 160, while power-limiting controller 200 can be housed in first connector insert 110. Power-limiting controller 200 can include transistors M1-M4, resistor R1, and amplifier A1 210, or these components can be considered to be separate from power-limiting controller 200. Power-delivery controller 220 can include or operate in conjunction with authentication circuit 240, temperature sensor 250, and LED control 230. Flowcharts showing the operation of power-delivery controller 220 are shown in the next two figures.

Figure 4:
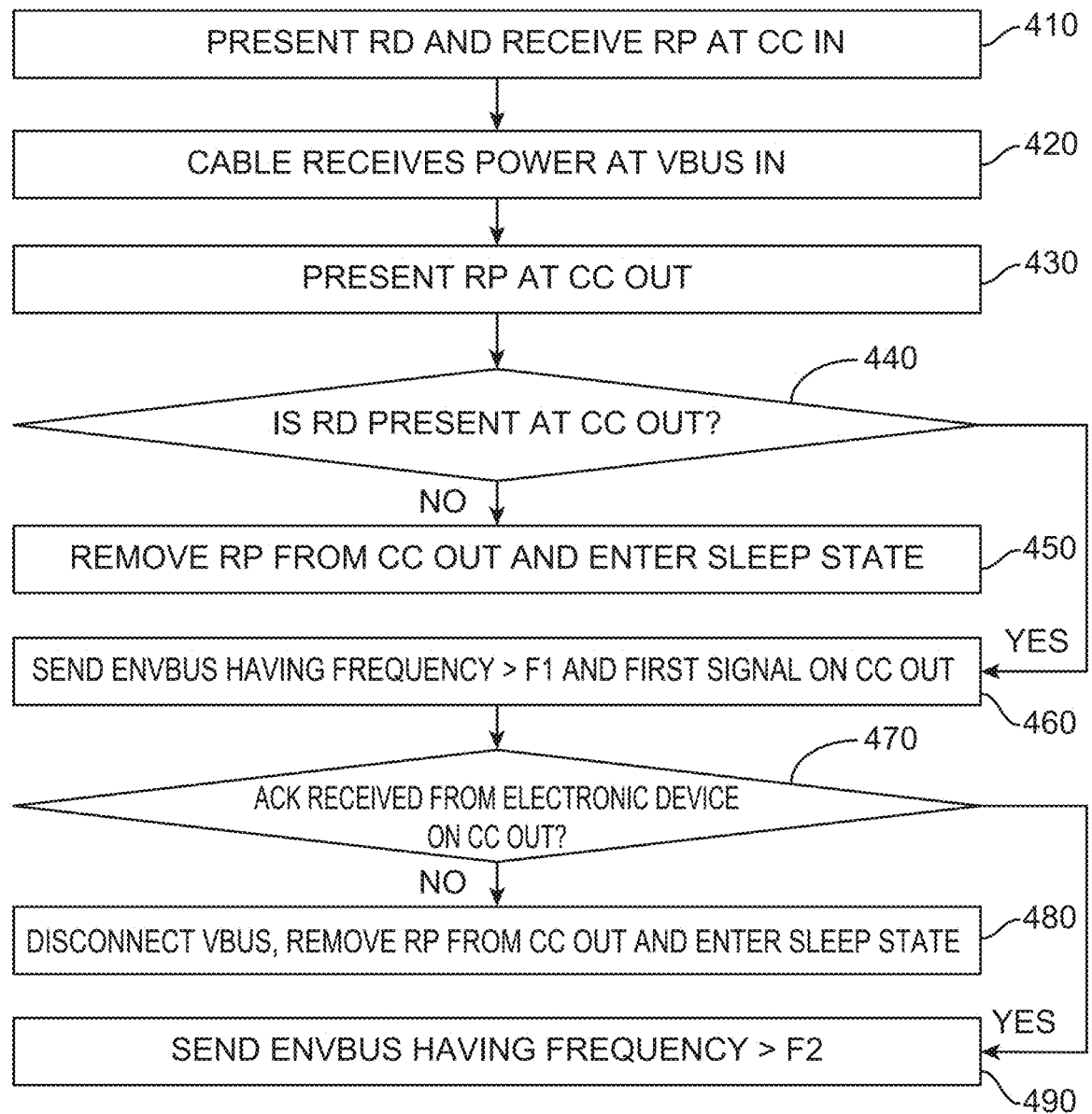
FIG. 4 is a flowchart illustrating the operation of a power-delivery controller according to an embodiment of the present invention.

FIG. 4 is a flowchart illustrating the operation of a power-delivery controller according to an embodiment of the present invention. When cable 100 is connected to power adapter 310 (both shown in FIG. 3), power-delivery controller 220 (shown in FIG. 2) can present a pulldown resistor and receive a corresponding pull-up resistance at CC IN in act 410. In act 420, cable 100 can receive power at one or more VBUS contacts of first connector insert 110. This power can be used to power a regulator used to supply regulated power to power-delivery controller. In response, power-delivery controller 220 can present a pull-up resistance at CC OUT to electronic device 360 (shown in FIG. 3) in act 430.

In act 440, it can be determined whether there is a pull-down impedance being provided by electronic device 360 at CC OUT. If there is not, the pull-up impedance at CC OUT can be removed and power-delivery controller can enter a sleep state, such as the deep-sleep power level, in act 450 If there is, power-delivery controller 220 can provide a periodic signal ENVBUS having frequency greater than F1 to power-limiting controller 200 (shown in FIG. 2) in act 450. To ensure that the pull-down impedance is from a valid electronic device 360, power-delivery controller 220 can further provide a first signal on CC OUT to electronic device 360, also in act 460. In act 470, power-delivery controller 220 can determine whether an acknowledgment is received from electronic device 360 on CC OUT. If such an acknowledgment is not received, the periodic signal being sent to power-limiting controller 200 can be stopped, the pull-up impedance at CC OUT can be removed, and power-delivery controller can enter a sleep state, such as the deep-sleep power level, in act 480. If an acknowledgment is received from electronic device 360, power-delivery controller 220 can provide a periodic signal having frequency greater than F2 on ENVBUS to power-limiting controller 200 in act 490.

The signal on ENVBUS can be different signals in these and other embodiments of the present invention. For example, ENVBUS can be a periodic signal such as a sinewave, square wave, ramp function, or other periodic signal. It can be provided and detected as a signal having a frequency above a threshold, within a range, or below a threshold. A frequency of F1 and F2 can have various values, such as 10, 15, 20, 25, 30, 35, 40, 45, 50, 55, 60, 65, 70, 75, 80, 85, 90, 95, or 100 k Hz, or other frequency.

Again, before the limitations on power delivered to electronic device 360 are removed, it can be desirable to ensure that power-delivery controller 220 is actually connected to a valid electronic device 360. Accordingly, a handshaking routine between power-delivery controller 220 an electronic device 360 can be employed. An example is shown in the following figure.

FIG. 5 illustrates a handshaking routine that can be employed between a power-delivery controller and electronic device according to an embodiment of the present invention. In act 510, power-delivery controller 220 (shown in FIG. 2) can send a first signal to electronic device 360 (shown in FIG. 3). In act 520, power-delivery controller 220 can determined whether a valid cyclical-redundancy check (CRC) has been received from electronic device 360. If it has, then the validity of electronic device 360 can be confirmed in act 530. If not, power-delivery controller 220 can continue sending the signal to electronic device 360 until a time limit has been reached in act 540. If the time limit is reached without a valid CRC being received, power-delivery controller 220 can determine that electronic device 360 is not valid in act 550. Again at this point, power can be removed from VBUS OUT. If a valid CRC is received from electronic device 360, then electronic device 360 can be confirmed as valid and the power limitation provided by resistor R1 can be removed by closing transistor M3 (both shown in FIG. 2.) Following that, higher power supply voltages can be negotiated for between electronic device 360 and power adapter 310 using the USB PD standard or other negotiation algorithm.

FIG. 6 is a block diagram illustrating the operation of a power-limiting controller according to an embodiment of the present invention. In this example, transistors M1-M4 and associated circuits are considered as part of power-limiting controller 200 (all shown in FIG. 2.) In act 610, power-limiting controller 200 can disconnect VBUS IN from VBUS OUT. In act 620, it can be determined whether a frequency of a signal on ENVBUS is greater than F1. If it is, then a limited power supply can be provided in act 630. If not, the power can remain off in act 610. In act 640, it can be determined whether a frequency of ENVBUS is greater than F2. If not, a limited current can continue to be provided. If it is, then the power supply limitation can be removed in act 650. In act 660 if the frequency of the periodic signal ENVBUS falls below F2, then power-limiting controller 200 can disconnect VBUS IN from VBUS OUT in act 610.

FIG. 7 is a state diagram illustrating the operation a power-limiting controller according to an embodiment of the present invention. In state 710, power can be off, that is, VBUS IN can be disconnected from VBUS OUT. If the frequency of ENVBUS is greater than F1, a current-limited power supply can be provided in state 720. Once a frequency of ENVBUS exceeds F2, the current limit on the power supply can be removed in state 730. In state 720, if the frequency of ENVBUS falls below F1, the current drawn at VBUS OUT exceeds a current limit, if excess temperature is detected, or if the handshaking between power-delivery controller 220 (shown in FIG. 2) and electronic device 360 (shown in FIG. 3) ceases, power-delivery controller 220 can stop sending the periodic signal ENVBUS, thereby causing power-limiting controller 200 to disconnect VBUS IN from VBUS OUT and state 720 can be entered. State 720 can be an off sequence where the protection circuit shown in FIG. 2 enters the deep-sleep power level In state 730, if the frequency of ENVBUS falls below F2, if excess temperature is detected, if the handshaking between power-delivery controller 220 and electronic device 360 ceases, or an authentication sequence fails, power-delivery controller 220 can stop sending the periodic signal ENVBUS, thereby causing power-limiting controller 200 to disconnect VBUS IN from VBUS OUT and state 720 can be entered.

Figure 8:
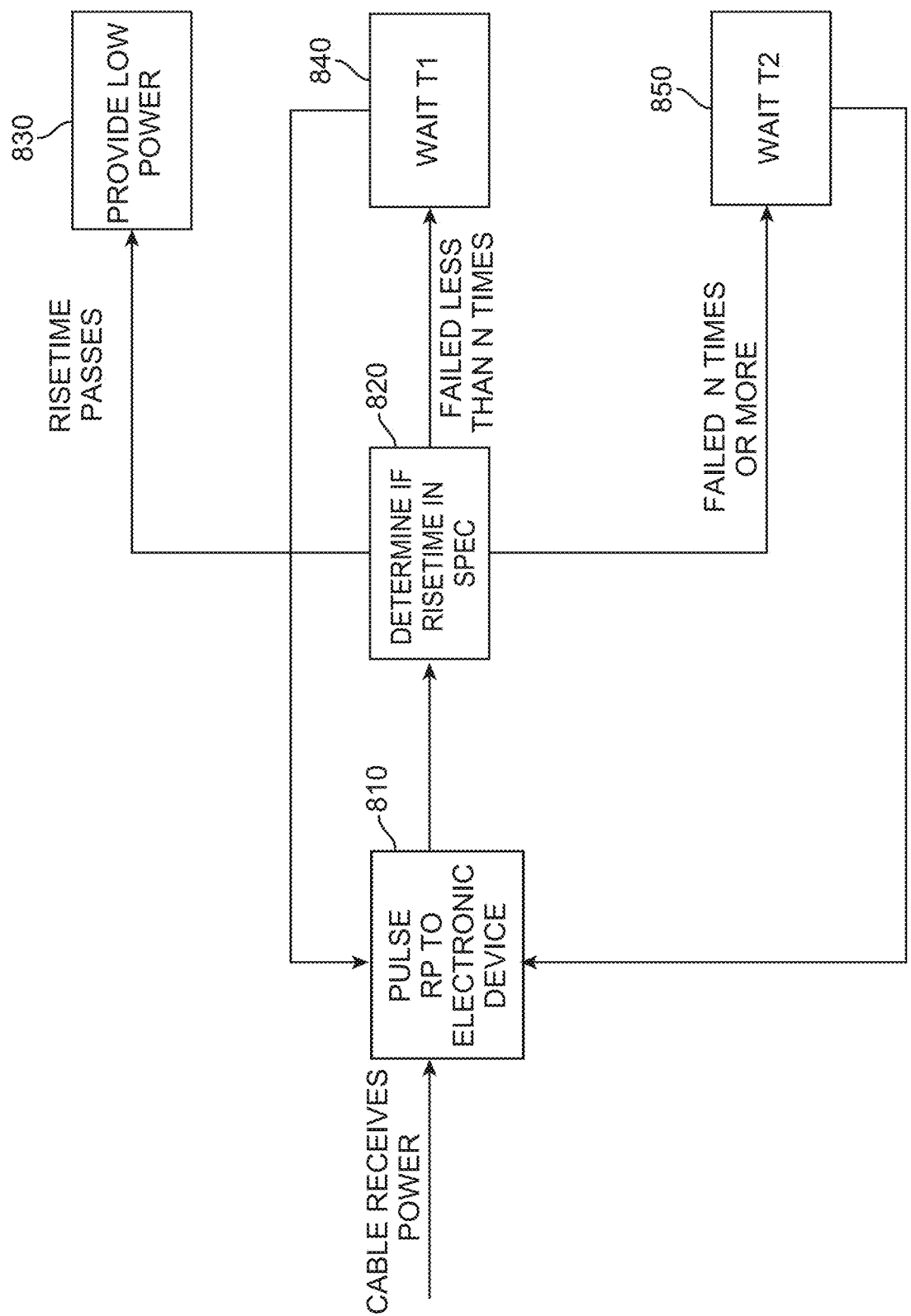
FIG. 8 is a state diagram illustrating the operation of corrosion protection circuitry according to an embodiment of the present invention.

FIG. 8 is a state diagram illustrating the operation of corrosion protection circuitry according to an embodiment of the present invention. Instead of maintaining a pull-up impedance at CC OUT, and therefore at the CC contact of second connector insert 160, power-delivery controller 220 (shown in FIG. 2) can pulse the impedance. The impedance can be active and connected for a duration that is sufficiently long to detect that electronic device 360 (shown in FIG. 3) is connected to second connector insert 160. The impedance can be disconnected from the CC OUT terminal and the CC contact afterwards. In the event that moisture is present at the second connector insert 160 CC contact, this pulsing can reduce the average electric field at the CC contact and can help to reduce corrosion.

This pulsing can also help to reduce the power dissipated by the protection circuit. When electronic device 360 is not connected to second connector insert 160, the clocks and power supplies for power-delivery controller 220 and power-limiting controller 200 can be largely shut off, and only limited circuitry can remain active to respond to a time out signal or interrupt signal. In response to the time out signal or interrupt signal, the protection circuit can leave the deep-sleep power level and enter an intermediate-power level. Again, the intermediate-power level can be a power level between the active-power level (where power is delivered to electronic device 360) and the deep-sleep power level. The protection circuit can enter the intermediate-power level and power-delivery controller 220 can pulse the impedance at the CC OUT contact in response to the time out signal.

These and other embodiments of the present invention can provide additional corrosion mitigation by determining whether a rise time of a voltage on the connection detection contact meets a specification during a pulse. If it does not, moisture might be present and power is not provided to a power contact of the second connector insert for a first duration. By not providing power, corrosion can be reduced at the power contact. When moisture is possibly detected, the power-delivery controller can back off the first duration before applying another pulsed impedance. This duration can be increased after moisture is possibly detected a number of times.

In state 810, once cable 100 receives power, power-delivery controller 220 can pulse a pull-up impedance to electronic device 360 via CC OUT. In state 820, power-delivery controller 220 can determine whether a rise time of a resulting voltage is within a specification. If it is within the specification, current-limited power can be provided in state 830. If the rise time is not within the specification, power-delivery controller 220 can wait a duration T1 in state 840 before applying another pulse pull-up impedance. When power-delivery controller 220 determines that this failure has occurred N or more times, power-delivery controller 220 can wait a second duration T2 in state 850 before applying another pulsed pull-up impedance in state 810.

Different specifications and different durations can be used in these and other embodiments of the present invention. For example, the first duration T1 and second duration T2 can be 1, 2, 3, 4, 5, 6, 7, 8, 9, or 10 seconds or other durations.

Embodiments of the present invention can provide protection circuits that can be used with cables connecting various types of devices, such as portable computing devices, tablet computers, desktop computers, laptops, all-in-one computers, wearable computing devices, cell phones, smart phones, media phones, storage devices, portable media players, navigation systems, monitors, power supplies, power adapters, remote control devices, chargers, and other devices. These cables can provide pathways for signals and power compliant with various standards such as one of the Universal Serial Bus (USB) standards including USB Type-C, High-Definition Multimedia Interface® (HDMI), Digital Visual Interface (DVI), Ethernet, DisplayPort, Thunderbolt™, MagSafe®, Lightning™, Joint Test Action Group (JTAG), test-access-port (TAP), Directed Automated Random Testing (DART), universal asynchronous receiver/transmitters (UARTs), clock signals, power signals, and other types of standard, non-standard, and proprietary interfaces and combinations thereof that have been developed, are being developed, or will be developed in the future.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The above description of embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated. Thus, it will be appreciated that the invention is intended to cover all modifications and equivalents within the scope of the following claims.

What is claimed is:

1. A cable comprising a first connector insert and a second connector insert, the cable further comprising protection circuitry, the protection circuitry comprising:
a power-limiting controller having an input coupled to a power contact of the first connector insert to receive power from a power adapter and an output coupled to a power contact of the second connector insert to provide power to an electronic device; and
a power-delivery controller to determine a presence of a first impedance provided by the electronic device to a connection detection contact of the second connector insert, and in response to determining the presence of the first impedance, to send a first signal to the power-limiting controller,
wherein in response to the first signal, the power-limiting controller provides a current-limited power supply at the power contact of the second connector insert to the electronic device, and wherein the first signal is a periodic signal having a first frequency.

2. The cable of claim 1 wherein when the power-delivery controller does not provide the first signal to the power-limiting controller, the power-limiting controller does not provide power to the electronic device.

3. The cable of claim 2 wherein the power-delivery controller is further configured to send a data signal to the electronic device, to receive an acknowledgement from the electronic device, and in response to receiving the acknowledgement from the electronic device, to send a second signal to the power-limiting controller, and wherein in response to the second signal, the power-limiting controller removes the current limit from power supply provided to the electronic device.

4. The cable of claim 3 wherein the second signal is a periodic signal having a second frequency, the second frequency different than the first frequency.

5. The cable of claim 4 wherein the power-delivery controller does not provide the second signal to the power-limiting controller, the power-limiting controller does not provide power to the electronic device.

6. The cable of claim 5 wherein the first signal and the second signal are square waves.

7. The cable of claim 1 wherein the first impedance of the electronic device comprises a pull-down resistance.

8. A power-delivery controller comprising:
circuitry coupled to a first input/output terminal to provide a first pull-down impedance at the first input/output terminal;
the circuitry further coupled to a second input/output terminal to determine a presence of a second pull-down impedance at the second input/out terminal, and in response to determining the presence of the second pull-down impedance, to provide a first periodic signal at a first output terminal; and
the circuitry further to provide a first signal at the second input/output terminal, and in response, to receive an acknowledgement signal at the second input/output terminal,
wherein in response to the acknowledgement signal the circuitry provides a second periodic signal at the first output terminal.

9. The power-delivery controller of claim 8 wherein the first periodic signal has a first frequency and the second periodic signal has a second frequency, the first frequency different than the first frequency.

10. The power-delivery controller of claim 9 wherein the circuitry determines a presence of a second pull-down impedance at the second input/out terminal by providing a pull-up impedance at the second input/output terminal for a first duration.

11. The power-delivery controller of claim 10 wherein when the circuitry provides a pull-up impedance for a first duration, the circuitry determines a rise time of the voltage at the second input/output terminal, and if the rise time is not in a first range, the circuitry does not provide the first periodic signal at the first output terminal, while if the rise time is in the first range, the circuitry does provide the first periodic signal at the first output terminal.

12. The power-delivery controller of claim 11 wherein when the rise time is not in the first range, the circuitry waits a second duration before providing a pull-up impedance at the second input/output terminal.

13. The power-delivery controller of claim 12 wherein the first pull-down impedance at the first input/output terminal provided by the circuitry is a Universal Serial Bus Type-C CC pin compatible pull-down resistance.

14. The power-delivery controller of claim 9 wherein the first periodic signal is a square wave having the first frequency and the second periodic signal is a square wave having the second frequency.

15. Protection circuitry for an untethered cable, the protection circuitry comprising:
a power-delivery controller to provide a pull-down impedance at a first input/output terminal and to receive a pull-up impedance at the first input/output terminal, and in response to receiving a pull-up impedance at the first input/output terminal, to provide a pull-up impedance at a second input/output terminal and to receive a pull-down impedance at the second input/output terminal, and in response to receiving the pull-down impedance at the second input/output terminal, to provide a first periodic signal at a first output; and
- a power-limiting controller to receive the first periodic signal, and in response, to provide a current-limited power supply.

16. The protection circuitry of claim 15 wherein the power-delivery controller further provides a first signal at the second input/output terminal, and in response, receives an acknowledgement signal at the second input/output terminal,
- wherein in response to the acknowledgement signal the power-delivery controller provides a second periodic signal at the first output terminal to the power-limiting controller, and
- wherein in response to receiving the second periodic signal, the power-limiting controller removes the current limit from the power supply.

17. The protection circuitry of claim 16 wherein when the power-delivery controller does not provide the first signal or the second periodic signal to the power-limiting controller, the power-limiting controller does not provide a power supply.

18. The protection circuitry of claim 17 wherein when the power-delivery controller provides a pull-up impedance at the second input/output terminal, the power-delivery controller determines a rise time of the voltage at the second input/output terminal, and if the rise time is not in a first range, the power-delivery controller does not provide the first periodic signal at the first output terminal, while if the rise time is in the first range, the power-delivery controller does provide the first periodic signal at the first output terminal.

19. The protection circuitry of claim 18 wherein the first periodic signal has a first frequency and the second periodic signal has a second frequency, the first frequency different than the first frequency.

20. The protection circuitry of claim 19 wherein the first periodic signal and the second periodic signal are square waves.

* * * * *